(12) United States Patent
McCann

(10) Patent No.: US 6,527,998 B1
(45) Date of Patent: Mar. 4, 2003

(54) METHOD OF FABRICATING INTEGRATED CIRCUIT PACK TRAYS USING MODULES

(75) Inventor: Carl D. McCann, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1286 days.

(21) Appl. No.: 08/582,678

(22) Filed: Jan. 4, 1996

Related U.S. Application Data

(63) Continuation of application No. 08/202,318, filed on Feb. 25, 1994, now abandoned.

(51) Int. Cl.[7] .................. B29C 45/14; B29C 70/74; B29C 70/84; B29C 70/70
(52) U.S. Cl. ............. 264/263; 264/272.14; 264/272.15; 264/272.17; 206/710; 206/725; 29/841
(58) Field of Search ................... 206/710, 712, 206/725; 264/272.14, 272.15, 272.17, 263; 29/837, 841; 439/55, 936

(56) References Cited

U.S. PATENT DOCUMENTS

| | | | | | |
|---|---|---|---|---|---|
| 3,517,438 A | * | 6/1970 | Johnson et al. | ............... | 29/841 |
| 3,946,864 A | * | 3/1976 | Hutson | ....................... | 206/332 |
| 4,067,951 A | * | 1/1978 | Fleming et al. | ........ | 264/272.15 |
| 4,264,549 A | * | 4/1981 | Utner | .................... | 264/272.15 |
| 4,379,505 A | * | 4/1983 | Alemanni | .................... | 206/329 |
| 4,444,309 A | * | 4/1984 | Morton, Jr. | ................. | 206/329 |
| 4,823,234 A | * | 4/1989 | Konishi et al. | ........ | 264/272.17 |
| 4,936,783 A | * | 6/1990 | Petersen | ...................... | 439/70 |
| 5,032,543 A | * | 7/1991 | Black et al. | ........... | 264/272.17 |
| 5,103,976 A | * | 4/1992 | Murphy | ...................... | 206/328 |
| 5,203,452 A | * | 4/1993 | Small et al. | ................. | 206/329 |
| 5,547,082 A | * | 8/1996 | Royer et al. | ................. | 206/725 |
| 5,611,452 A | * | 3/1997 | Bonora et al. | ............. | 206/710 |
| 5,622,275 A | * | 4/1997 | Citterio | ..................... | 206/725 |
| 5,636,745 A | * | 6/1997 | Crisp et al. | ................. | 206/725 |

* cited by examiner

*Primary Examiner*—Angela Ortiz
(74) *Attorney, Agent, or Firm*—Jeanette S. Harms; Patrick T. Bever; Edel M. Young

(57) ABSTRACT

A method of fabricating a pack tray is provided wherein a plurality of modules are secured in a master frame. Each pack tray typically includes two types of modules: a chip module having an aperture therein to secure an integrated circuit chip and a pick-up module for picking up the pack tray. In one embodiment, all modules are identical in size. In another embodiment, the modules differ in size.

10 Claims, 7 Drawing Sheets

| 67 | 61 | 61 | 61 | 67 |
|---|---|---|---|---|
| 67 | 61 | 65 | 61 | 67 |
| 67 | 61 | 61 | 61 | 67 |

Figure 6

METHOD OF FABRICATING INTEGRATED CIRCUIT PACK TRAYS USING MODULES

This application is a continuation of application Ser. No. 08/202,318, filed Feb. 25, 1994, now abandoned.

BACKGROUND OF THE INVENTION

1. Field of the Invention

The present invention relates to pack trays for shipping integrated circuit chip packages, and in particular to a pack tray fabricated using interchangeable modules, thereby allowing different size packages to be secured in the same master frame.

2. Description of the Related Art

Pack trays for the shipment of integrated circuit chip packages are well known in the art. FIG. 1 illustrates a conventional pack tray 1 having apertures 2, ridges 3, and recessed areas 6 for securing chip packages 4. Specifically, the leads 4A of package 4 are positioned on the outside of ridge 3, whereas a raised portion (not shown) of package 4 which is formed on the underside of package 4 fits into aperture 2. Another pack tray (not shown) is placed on pack tray 1 after all chip packages 4 are positioned to ensure packages 4 and leads 4A are insulated from direct impacts and to prevent movement of chip packages 4 during shipment. Pack tray 1 further includes sections 5 which are solid pieces that provide a surface suitable for vacuum pickup of pack tray 1.

Pack tray 1 is fabricated in the following manner. A master mold is formed out of metal, then machined to provide apertures 2, ridges 3, and recessed areas 6. Finally, plastic is flowed around the master mold.

Because machining the master mold is expensive, manufacturers have typically fabricated pack trays to hold a large number of chip packages, i.e. between 15 and 40 chip packages, thereby reducing the shipping cost per chip package. However, some customers order only a few chip packages, while other customers order single chips in different package sizes, thereby dramatically increasing the shipping cost per chip package. Therefore, a need arises for a pack tray designed for a few chip packages and for a pack tray designed for different chip package sizes, both trays designed to minimize shipping cost per chip package.

SUMMARY OF THE PRESENT INVENTION

In accordance with the present invention, a method of fabricating a pack tray for integrated circuit chip packages comprises the steps of: providing a master frame, providing a plurality of modules, and securing the plurality of modules in the master frame. Typically, each modular pack tray includes two types of modules: a chip module having an aperture therein to secure an integrated circuit chip package and a pick-up module for picking up the pack tray. In one embodiment, the pick-up module has a surface suitable for vacuum pick-up.

In one fabrication process in accordance with the present invention, the master frame and modules are machined from metal. To secure the modules in the master frame, plastic is then flowed around the plurality of modules positioned in the master frame.

In accordance with one embodiment of the present invention, the plurality of modules have an identical size. In other embodiments, at least one of the plurality of modules has a size different from at least one other of the plurality of modules. In yet another embodiment, a module includes lightening/stiffening sections.

The present invention significantly reduces the machining expense associated with prior art pack trays, thereby dramatically reducing the shipping cost per chip package, particularly in small shipments of chip packages. The present invention also provides shipping flexibility by allowing different size packages to be secured in the same pack tray. Moreover, the lightening/stiffening sections in accordance with the present invention significantly reduce the weight of a module as well as the cost of fabrication.

BRIEF DESCRIPTION OF THE DRAWINGS

FIG. 6 illustrates another configuration of a modular pack tray including chip modules, a pick-up module, and lightening/stiffening sections.

DETAILED DESCRIPTION OF THE DRAWINGS

Figure 2:
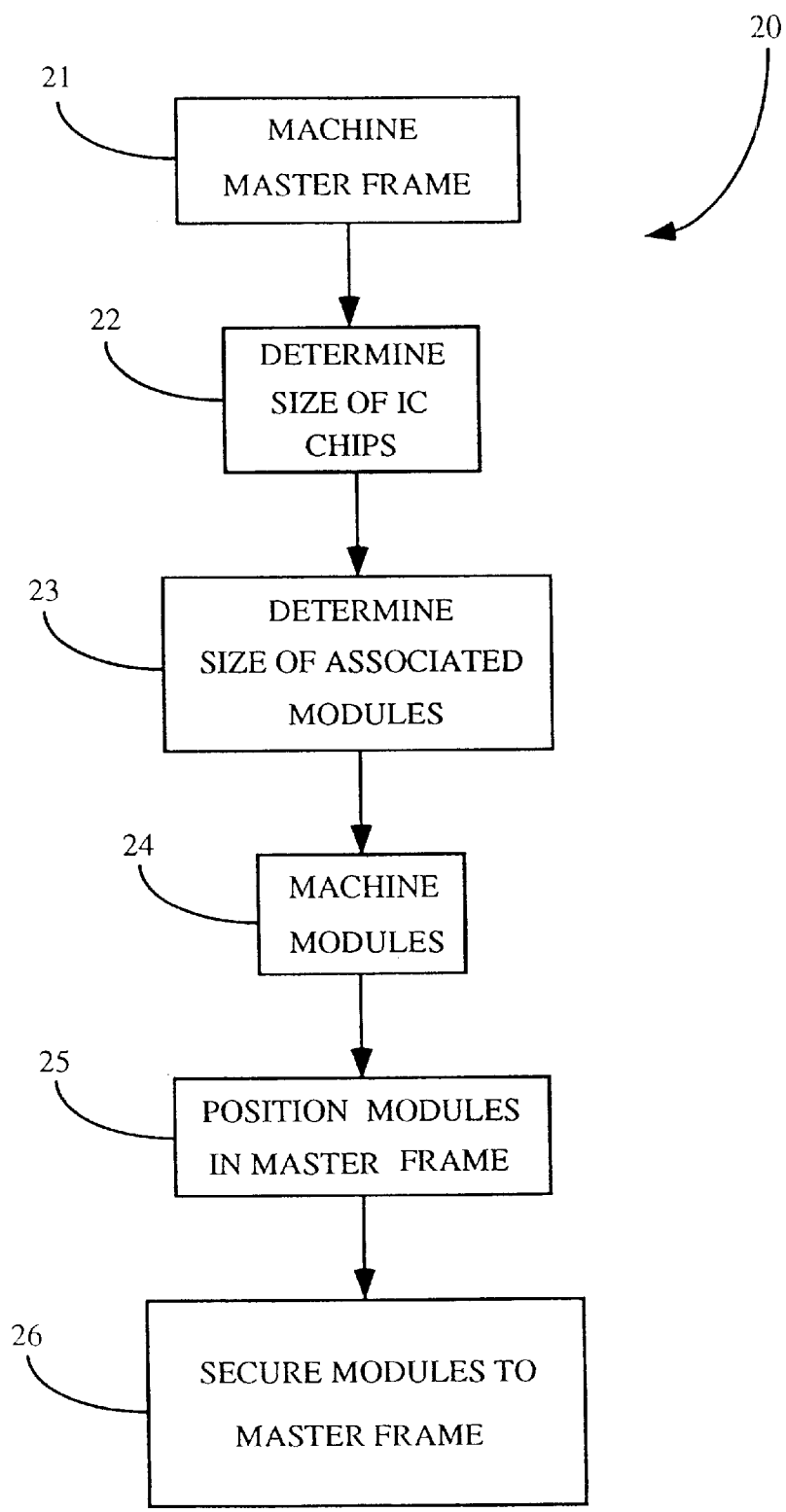
FIG. 2 illustrates the steps to fabricate a modular pack tray in accordance with the present invention.

FIG. 2 illustrates the steps 20 to fabricate a modular pack tray. Referring to FIG. 2, step 21 includes machining a master frame which accomodates different size modules (explained in detail in reference to FIGS. 4 and 5). In step 22, the sizes of the chip packages to be shipped are determined. In accordance with the present invention, a chip module is machined to secure a single chip package. Therefore, in step 23, the sizes of the chip modules to secure the chip packages are determined. Then, in step 24, the modules are machined to fit into the master frame. Typically, each modular pack tray includes two types of modules: a chip module for securing an integrated circuit chip package and a pick-up module for picking up the pack tray. In another embodiment of the present invention, the module includes lightening/stiffening sections (explained in detail in reference to FIG. 7).

Figure 1:
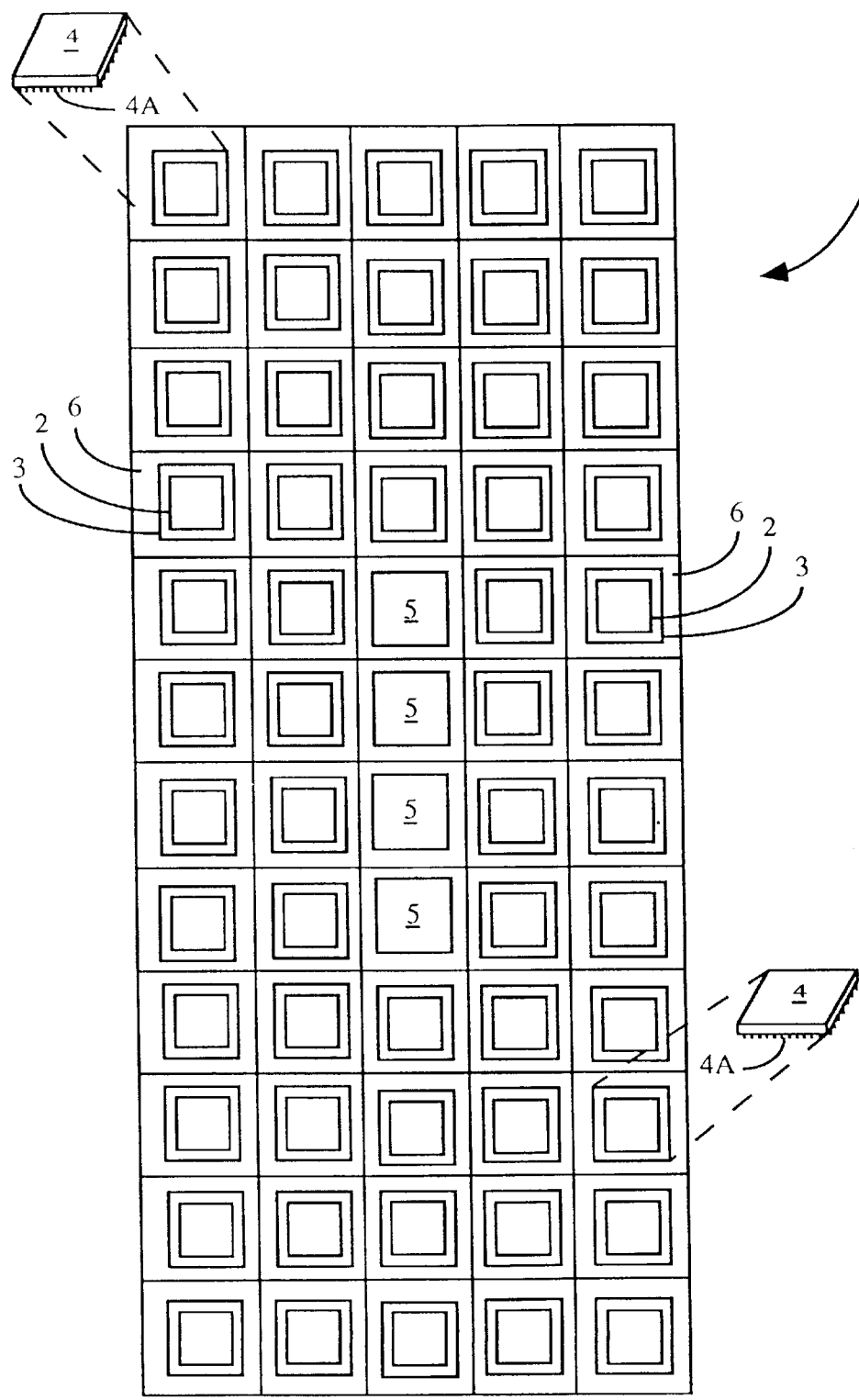
FIG. 1 shows a conventional pack tray.

In comparison to machining a conventional pack tray (FIG. 1), machining of the master frame and the individual modules in accordance with the present invention is much less expensive, thereby significantly reducing the packing cost per chip. Referring back to FIG. 2, step 25 includes positioning the machined modules into the master frame. Finally, in step 26, plastic is flowed around the master frame and positioned modules, thereby securing the modules in the master frame.

Figure 3:
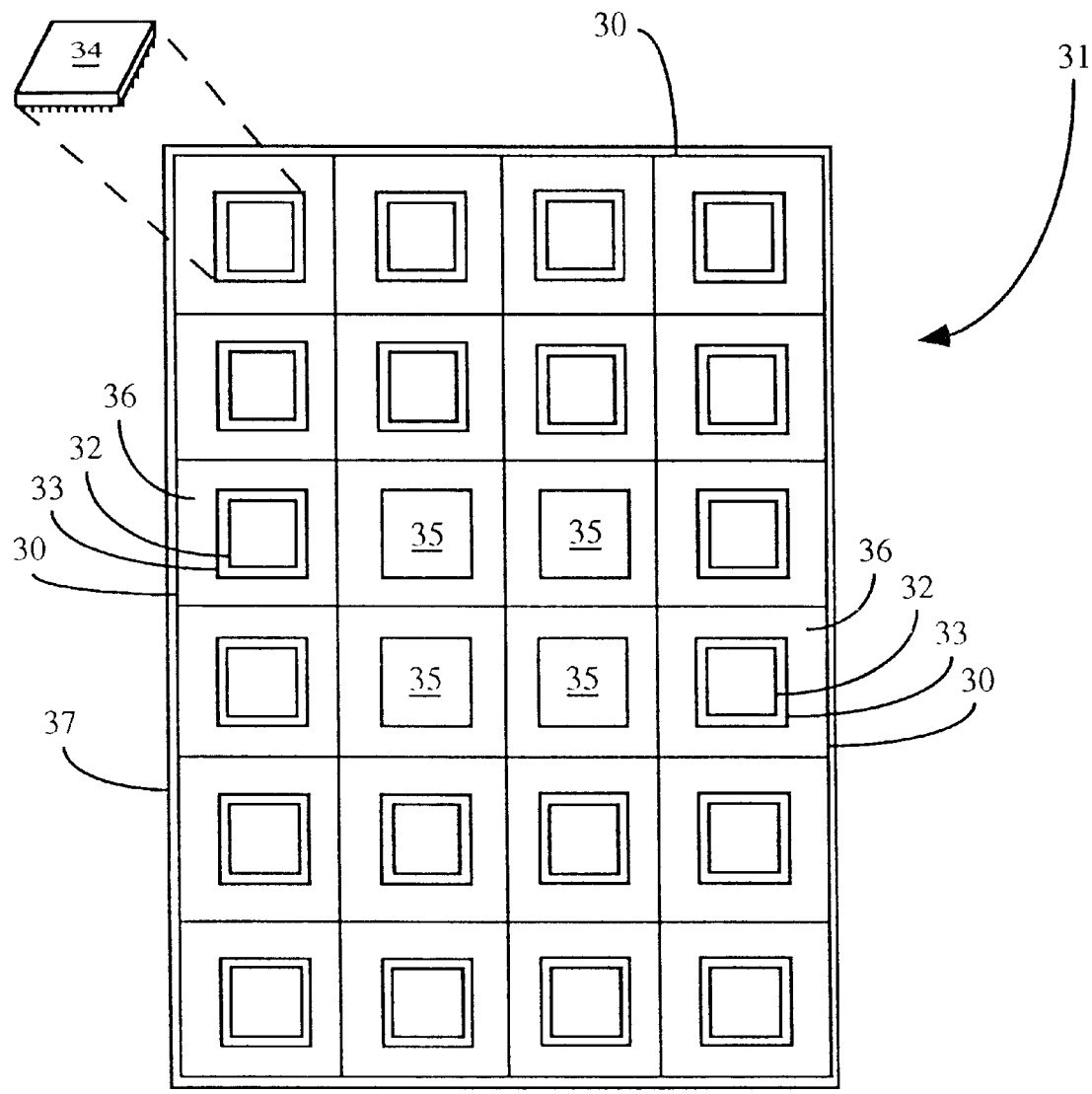
FIG. 3 shows one embodiment of a modular pack tray in accordance with the present invention.

FIG. 3 illustrates one embodiment of a modular pack tray 31 in accordance with the present invention that includes a master frame 37, twenty chip modules 30, and four pick-up modules 35. Each chip module 30 includes a ridge 33, an aperture 32, and a recessed area 36. Thus, this embodiment secures twenty chip packages, such as chip package 34. In this embodiment, pick-up modules 35 are solid pieces that provide a surface suitable for a vacuum pick-up of modular pack tray 31.

Figure 4:
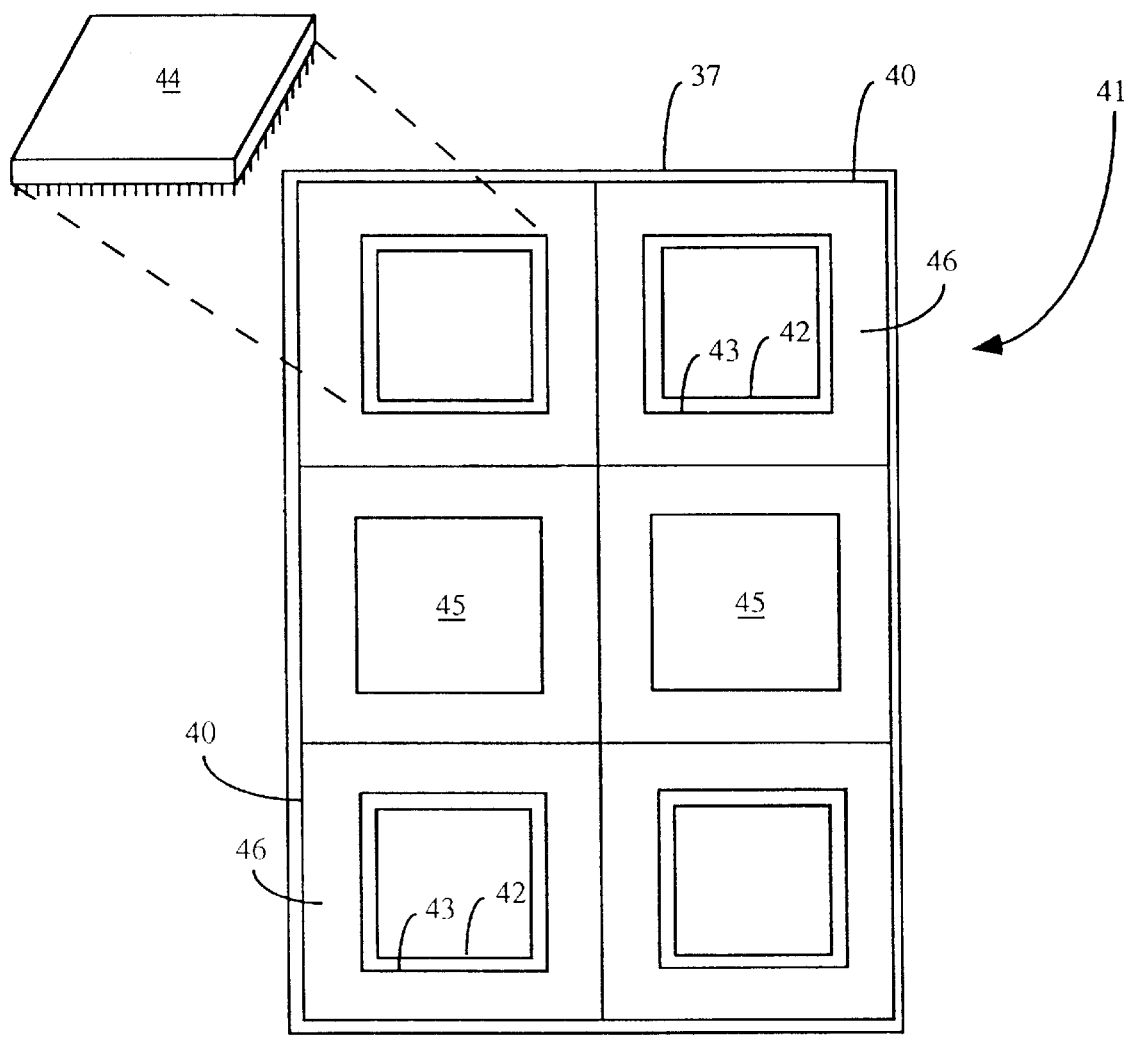
FIG. 4 illustrates another embodiment of a modular pack tray in accordance with the present invention.

In another embodiment of the present invention, shown in FIG. 4, a modular pack tray 41 incorporates the same master frame 37 (FIG. 3) and includes four chip modules 40, each chip module 40 including a ridge 43, an aperture 42, and a recessed area 46. Thus, modular pack tray 41 secures four chip packages, such as chip package 44. Chip module 40 is larger than chip module 30 (FIG. 3) to accomodate the larger size chip package. Note that modular pack tray 41 further includes two pick-up modules 45.

Figure 5:
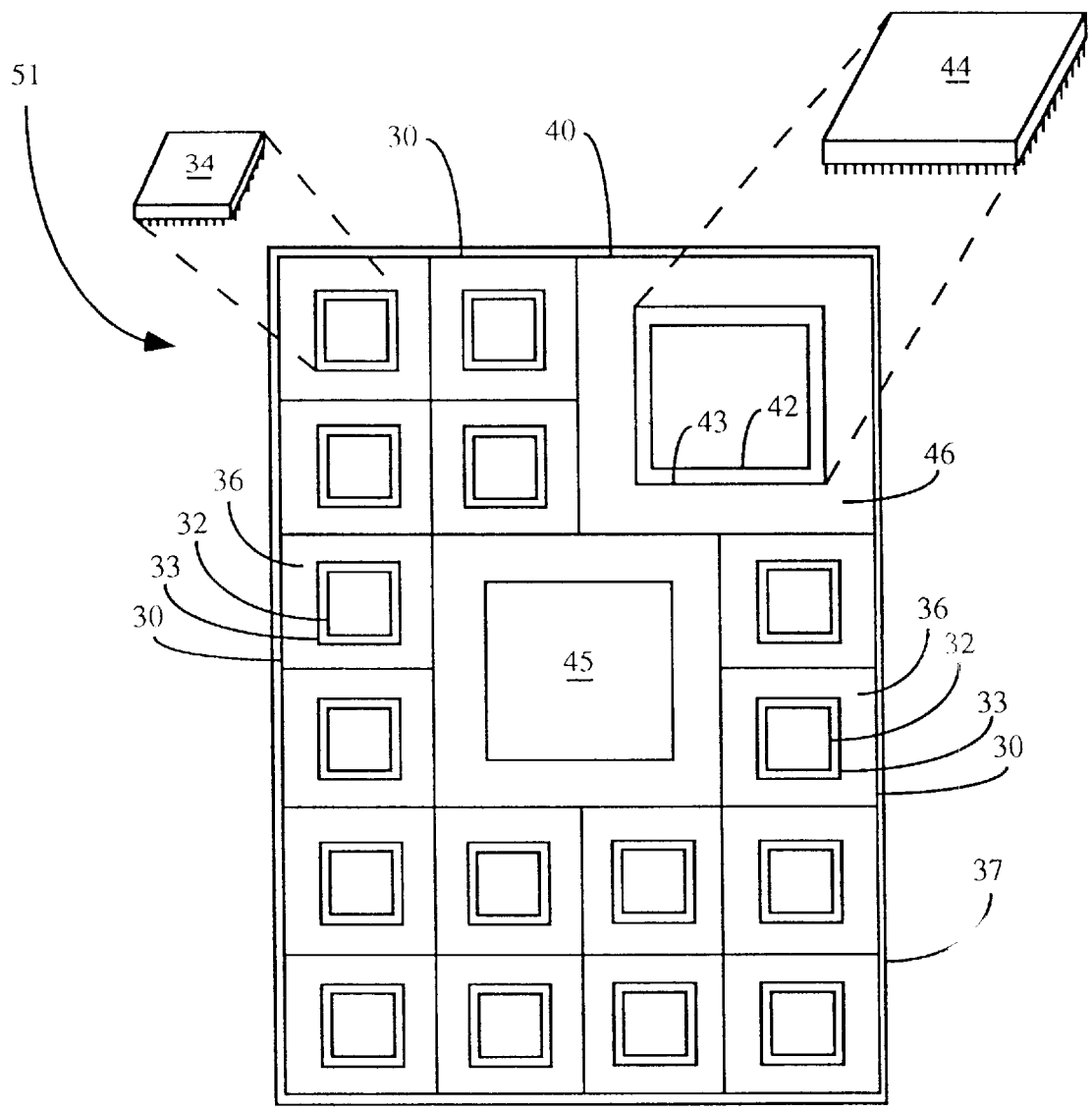
FIG. 5 shows yet another embodiment of a modular pack tray in accordance with the present invention.

In yet another embodiment of the present invention shown in FIG. 5, modular pack tray 51 incorporates the same master frame 37 (FIG. 3) and includes chip modules of different sizes. Specifically, modular pack tray 51 includes sixteen chip modules 30 (FIG. 3) and one chip module 40 (FIG. 4). Thus, this embodiment secures chip packages of two sizes, such as chip packages 34 and 44.

Figure 6:
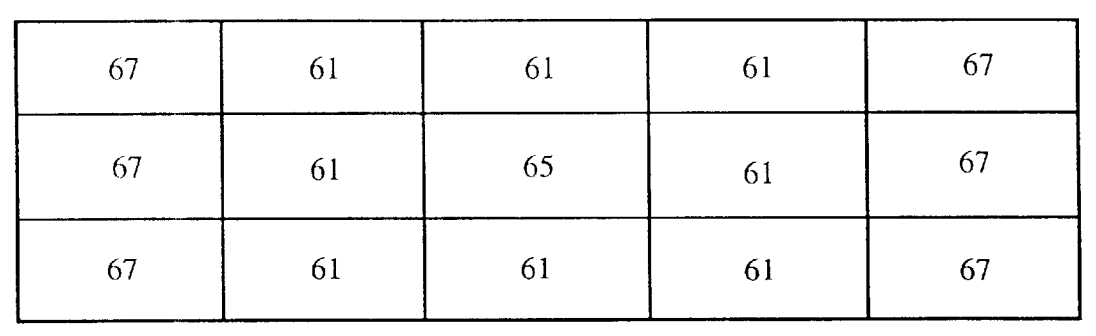
Figure 7:
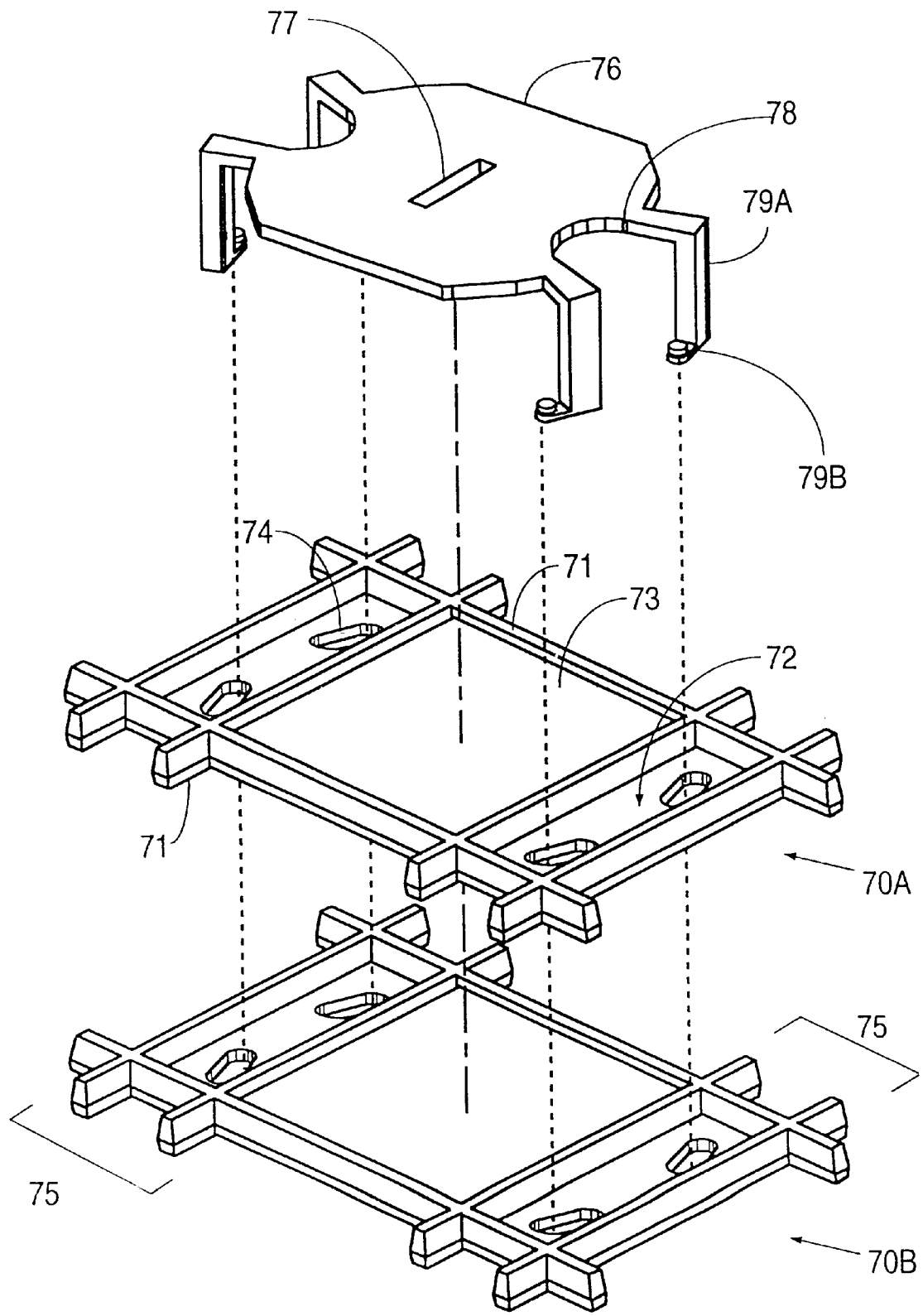
FIG. 7 shows two pick-up modules having apertures for engaging a twist lock and lightening/stiffening sections.

In another embodiment of the present invention schmatically shown in FIG. 6, sections 61 represent chip modules to secure the chip packages (not shown), section 65 represents a pick-up module, whereas sections 67 represent modules having lightening/stiffening sections (described in detail in reference to FIG. 7). This embodiment is particularly useful for chip packagess having dimensions of 10×10, 14×14, 14×20, and 20×20 (all dimensions in mm). Chip packages having larger dimensions, such as 24×24, 28×28, 32×32, and 40×40 (all dimensions in mm), are typically placed in a modular pack tray having fewer chip modules, such as modular pack tray 40 shown in FIG. 4. In that embodiment, pick-up modules 45 preferably include the below-described lightening/stiffening sections.

Referring to FIG. 7, pick-up modules 70A and 70B, include lightening/stiffening sections 75. In accordance with this embodiment of the present invention, lightening/stiffening sections 75 include recesses 72, thereby significantly reducing the weight of pick-up modules 70A and 70B. The primary cost of any pack tray is driven by the costs of material required to fabricate the pack tray. Thus, lightening/stiffening sections 75 provide the further advantage of reducing material costs during fabrication. To compensate for this removal of material, pick-up modules 70A and 70B further include rod sections 71, thereby adding strength and rigidity to these modules at minimal material cost. These rod sections 71 ensure that the delicate leads on the chip packages are protected during handling and thermal cycling (for example, during dry bake applications well known to those in the art). Pick-up modules 70A and 70B are positioned within a master frame (not shown), along with chip modules (also not shown), and plastic is flowed over all modules, thereby providing a modular pack tray in accordance with the present invention.

In the embodiment of the invention illustrated in FIG. 7, lightening/stiffening sections 75 further include apertures 74 for engaging a twist lock 76. Specifically, a person grasps lock 76 by finger notches 78, inserts securing posts 79A through apertures 74 in pick-up modules 70A and 70B, then slightly pushes down while twisting lock 76. The ball locks 79B, during this twisting, slide along the bottom of pick-up module 70B, thereby securing the two pack trays together. To unlock the pack tray assembly, the person uses a screwdriver or coin in slot 77 to twist lock 76 in the opposite direction used to secure the pack trays together.

The above-described embodiments of the present invention are illustrative only and not limiting. For example, master frame sizes and module configurations vary depending on chip size and lightening/stiffening sections. In another embodiment, more than two different sizes of modules are placed in the master frame. In yet another embodiment, different types of modules (other than chip modules or pick-up modules) are secured in the master frame. Other embodiments will be apparent to those skilled in the art of chip package shipping. The present invention is set forth in the appended claims.

I claim:

1. A method of fabricating a pack tray for integrated circuit chip packages comprising the steps of:

providing a master frame;

providing a plurality of modules that are separate from said master frame; and securing said plurality of modules in said master frame to form said pack tray, wherein said step for securing includes flowing plastic around said plurality of modules in said master frame.

2. The method of claim 1 wherein said step of providing a plurality of modules includes providing a structure in at least one module for picking up said pack tray.

3. The method of claim 2 wherein said structure includes a module having a substantially flat surface.

4. The method of claim 1 wherein said step of providing a plurality of modules includes providing at least one chip module having an aperture therein.

5. The method of claim 1 wherein said master frame is machined from metal.

6. The method of claim 1 wherein said plurality of modules are machined from metal.

7. The method of claim 1 wherein said plurality of modules have an identical size.

8. The method of claim 1 wherein at least one of said plurality of modules has a size different from at least one other of said plurality of modules.

9. The method of claim 1 wherein at least one of said plurality of modules includes a lightening section.

10. The method of claim 1 wherein at least one of said plurality of modules includes a stiffening section.

* * * * *